No. 738,418. PATENTED SEPT. 8, 1903.
E. A. D'AQUILA & B. MARTELLI.
SAFETY GAS BURNER.
APPLICATION FILED MAR. 7, 1903.
NO MODEL.
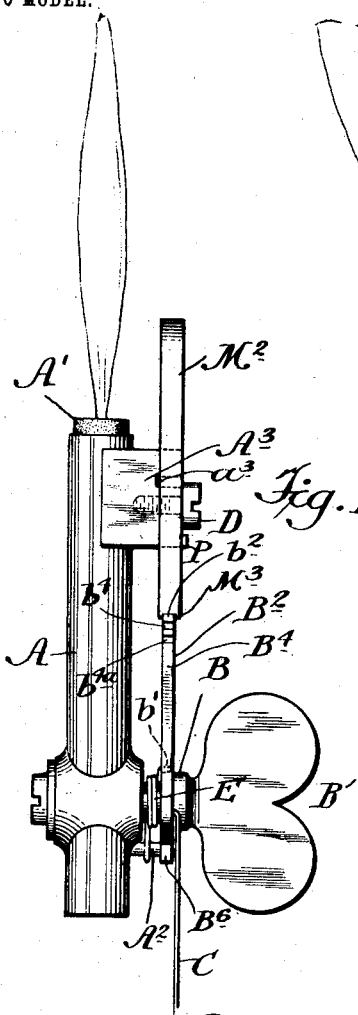
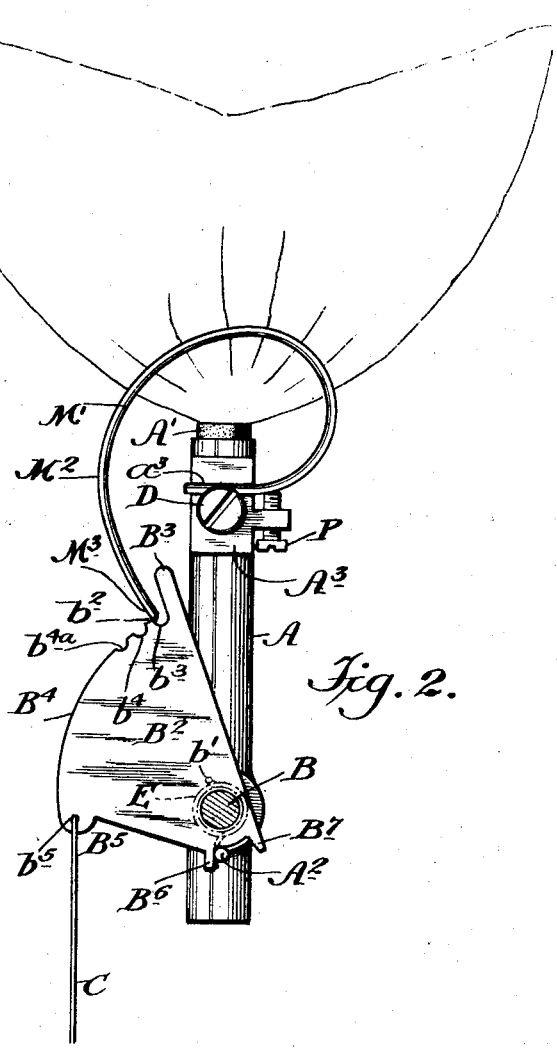
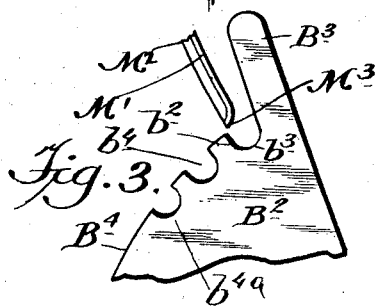
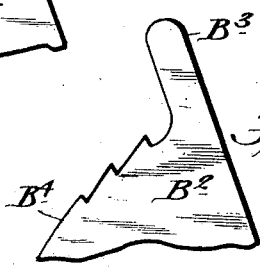
WITNESSES:
A. R. Appleman
M. F. Boyle
INVENTORS
Ernest A. d'Aquila and
Bernardo Martelli
BY Thomas Drew Stetson
ATTORNEY No. 738,418. Patented September 8, 1903.

UNITED STATES PATENT OFFICE.

ERNEST A. D'AQUILA, OF NEWARK, NEW JERSEY, AND BERNARDO MARTELLI, OF NEW YORK, N. Y.

SAFETY GAS-BURNER.

SPECIFICATION forming part of Letters Patent No. 738,418, dated September 8, 1903.

Application filed March 7, 1903. Serial No. 146,611. (No model.)

*To all whom it may concern:*

Be it known that we, ERNEST A. D'AQUILA, residing at Newark, in the county of Essex and State of New Jersey, and BERNARDO MARTELLI, residing in the borough of Manhattan, in the city and State of New York, have invented a certain new and useful Improvement in Safety Gas-Burners, of which the following is a specification.

The improvement pertains to the class which automatically closes the passage when the flame is extinguished. We employ a construction in which the heat of the flame acts on a slender device of curved form, which we may term a "dog," extending alongside. The plug of the cock is easy to turn and subject to the action of a spring coiled several times around the plug and exerting tension which induces a prompt closing when it is free to act. In igniting the gas the plug is turned, and the gas being ignited the cock is held open by the operator for a sufficient period (it need only be one or one and a half seconds) to allow the dog to become heated. The device may then be left to take care of itself, the dog holding the cock open notwithstanding the considerable tension of the helical spring, which tends to close it. When from any cause the gas-jet is extinguished, our slender curved dog extending alongside the flame cools, thereby inducing a change which soon releases the plug and allows the latter to be turned, and the cock is closed by the action of the spring. The dog is so slender as to be rapidly heated and cooled. It is so arranged as to cover but a small portion of the flame, and that portion is what is termed the "dark" portion, so near the burner-tip that the luminous quality of the flame has not become much developed. By giving this dog the curve shown and making only a moderate depth of offset for it to engage with on a plate fixed to the plug we attain a reliable holding against the gentle closing force of the automatic spring, while it can yield without serious strain when the hand is applied to intentionally close the cock. We provide means for adjusting with great delicacy if such shall be required.

The following is a description of what we consider the best means of carrying out the invention.

The accompanying drawings form a part of this specification.

Figure 1 is an edge view. Fig. 2 is a face view. Fig. 3 shows a portion corresponding to Fig. 2 on a larger scale. Fig. 4 shows another portion corresponding to the same figure, Fig. 2, on a still larger scale. Fig. 5 is a face view of a portion corresponding to Fig. 2 on the same scale as Fig. 2, but showing a modification.

Similar letters of reference indicate corresponding parts in all the figures where they appear.

A is an upright portion of the gas-pipe, and A' a gas-tip, of lava or other suitable material, performing its usual functions. It is what is termed a "fish-tail" burner adapted to form a flat flame.

B is the plug of a cock controlling the flow of the gas, which may be of any ordinary construction and capable of being operated in the usual way by a thumb-piece.

$B^2$ is a branched plate cut by dies or otherwise into the form shown and rigidly secured on the plug B. The plane of this plate is at right angles to the axis of the plug.

$B^3$ is a finger which extends beyond the general contour of the plate at the top. Adjacent to this is an offset $b^2$, shown as produced by making a shallow notch $b^3$ in the periphery, which performs important functions.

$B^4$ is a curved portion of the edge of the plate, which curve is struck from a point near the axis of the plug B.

To a hole $b^5$ near the angle $B^5$ is loosely connected a pendent wire C, which serves as a pull-piece to turn the plug into the open position when required.

$A^2$ is a stout pin fixed to the upright A, and $B^6$ $B^7$ are bottom branches or fingers on the plate $B^2$ arranged to strike the pin $A^2$ on one side and the other, respectively, and limit the turning of the plug.

$A^3$ is a block brazed or otherwise rigidly fixed on the pipe A. It is bifurcated by forming a saw-kerf $a^3$ with a proper hack-saw, and D D' represent a large-headed screw tapped into such block, having its head somewhat overlapping the saw-kerf.

M' M² represent our dog, a thin compound bar serving as a stop. It is curved, as shown, and one end is inserted in the saw-kerf $a^3$ and firmly confined therein by the edge of the head of the screw D. Changes of position of the other end, the free end M³ of this compound bar, are important. The main body of this dog is in two layers of metal, the inner face M' being of low steel and the exterior M² being of copper, brazed together. The parts are so formed and arranged that when the cock is turned to allow a jet of gas to issue and such jet is lighted a considerable portion of this compound dog lies alongside the dark portion of the flame, but not immersed in or appreciably disturbing it. The free end M³ is by the form and relations of the parts always held near the curved path traversed by the notch $b^3$ as the cock is opened and closed. The copper has a higher coefficient of expansion than the steel, and the position of the end changes radially as the body of the spring is heated and cooled. By reason of its curved form the dog presents a considerable portion of its length so near one of the plane faces of the flame that the metal will be rapidly heated and by reason of the difference in expansion of its two faces will increase its curvature when the gas is ignited. It is so thin and so exposed to radiation that when there is no flame it rapidly cools, and by virtue of its copper exterior contracting more than its steel interior face the dog becomes less curved.

E is a helical spring, the main body coiled several times around the plug B of the cock, one end engaged in the hole $b'$ in the plate B², and when forcibly coiled the other end abuts against the side of the pin A². This spring has sufficient tension exerted in the direction to reliably turn the plug promptly into the completely-closed position whenever it is permitted to do so.

There are two or more additional offsets corresponding to $b^2$ produced by other notches, as $b^4$ and $b^{4a}$, in the curved periphery B⁴, so located that when the free end M³ of the dog M is received in one of these notches it will hold the cock in a partially-open position. Turning the plug B in the ordinary manner as far as it will go will engage the free end M³ of the compound dog M in the notch $b^3$ and hold the cock fully open, but turning it to a less extent will cause M to engage in one of the other notches $b^4$ or $b^{4a}$, consuming correspondingly-reduced quantities of gas and giving correspondingly less light.

We have in our experiments made the dog M of metal about three-sixteenths of an inch wide and something less than one-sixteenth in thickness. This is curved so as to make an approximate ellipse having a major axis of something like two inches. The free end M³ is formed with a sharp bend outward, and the brass being removed by filing or otherwise the end is entirely steel. We can use high steel for the inner face M' and harden the end M³, if desired. So, also, we can still more easily make the plate B² with the notched edge or the whole of hardened steel; but the strain is slight, and the parts will endure long use before the angles are appreciably dulled when ordinary low steel is used.

P is a small screw tapped in the block A³ and arranged to press upward against the compound dog M near the block. This may be turned by a suitable key when the burner is manufactured or at any subsequent period when required in order to delicately adjust the relations of the free end M³ of the offsets formed by the notches. It should stand very near when cold, so that a little increase in its curvature by heating will cause it to engage and hold the cock open, and a very little straightening will cause it to let go and allow the cock to be closed by the action of the spring E.

In igniting the gas the operator rubs a match and with the same hand or the other turns the plug to put the cock in the open condition and holds it so while the gas flows for a second or two—a period considerably within the time during which an ordinary match will burn. So soon as the dog M becomes sufficiently warmed its free end M³ will dip into and engage the offset formed by the proper notch and the cock will remain open. Now the operation of lighting is completed. When it is desired to turn off the gas, this may be accomplished by acting on the plug in the ordinary manner, the dog M yielding its hold to the superior force exerted by the attendant.

If from any cause the flame is extinguished without turning the plug, the gas will continue to flow idly only one or two seconds. So soon as the thin metal of our compound dog has cooled it will straighten a little, and rightly adjusted a slight change will cause it to give up its hold on the offset, and the cock will be closed by the action of the spring E.

By making the compound spring-dog M of the approximately-circular form shown, but having the free end M³ considerably exterior to the general curve, we obtain a good degree of uniformity in the elastic action throughout the whole and present a considerable length of the spring to the side of the flame along so low a line as to not appreciably darken it. The form also so conditions the parts that when in the ordinary turning off of the gas by hand the strong force of the attendant is applied, through the thumb-piece B', to turn the plug, the spring, becoming still more bent, will be shortened and will therefore easily let go.

The offsets B⁶ B⁷ serve as limiting-stops to strike the pin A A², and thus to prevent the turning of the plug too far in either direction. The upper finger B³ serves as an additional stop to prevent turning the plug too far in letting on the gas.

Modifications may be made without departing from the principle or sacrificing the advantages of the invention. Parts may be omitted. The notches $b^4$ $b^{4a}$ may be dispensed with, in which case another cock (not shown) may obviously be introduced in the pipe A if it is required to ever use the burner with less than the full force of the gas. The delicate adjusting means P may be omitted, and the compound dog M may be adjusted by other means, as simply bending the metal by a pair of pliers until it is just right. Instead of making the offsets by notches having equal sides, as shown, we can make them by having the sides very greatly unequal. Fig. 5 shows such a form of the offsets.

What we claim is—

1. The combination with a suitable gas-tip A' supply-pipe A, controlling-valve B and rigidly-attached plate B², the latter provided with an offset $b^2$, of means E for automatically closing the valve when liberated, and a C-shaped dog mounted parallel to and entirely outside of such jet, arranged to engage and release such offset, substantially as herein specified.

2. The combination with a suitable gas-tip A', supply-pipe A, controlling-valve B and rigidly-attached plate B² the latter provided with an offset $b^2$, of a helically-coiled spring E compactly arranged around the plug and a slender compound spring near the gas-jet, arranged to engage and release such offset, all substantially as herein specified.

3. The combination with a suitable gas-tip A' and supply-pipe A, controlling-valve B and rigidly-attached plate B², the latter provided with an offset $b^2$ and also with a finger B³ and with limiting-stops B⁶ B⁷, of a fixed stop A² inclosed between the latter, and with a thin compound spring-dog M' M² M³ mounted adjacent to but not in the gas-jet, arranged to engage and release such offset, substantially as herein specified.

4. The combination with a suitable gas-tip A' and supply-pipe A, of a controlling-valve B having a rigidly-attached plate B² provided with a series of offsets $b^2$ $b^4$ $b^{4a}$, and with a thin compound spring-dog M' M² M³ mounted adjacent to but not in the gas-jet, and with an adjusting-screw P, all arranged to serve substantially as herein specified.

5. The combination with a suitable gas-tip A' and supply-pipe A, of a controlling-valve B and a rigidly-attached plate B² the latter provided with a series of offsets $b^2$ $b^4$ $b^{4a}$, and with a thin compound spring-dog M' M² M³ mounted adjacent to but not in the gas-jet, arranged to engage in one of such offsets and to hold and release the cock, substantially as herein specified.

In testimony that we claim the invention above set forth we affix our signatures in the presence of two witnesses.

ERNEST A. D'AQUILA.
BERNARDO MARTELLI.

Witnesses:
VINCENZO ROMANO,
J. B. CLAUTICE.